United States Patent
Chou et al.

(10) Patent No.: US 7,526,676 B2
(45) Date of Patent: Apr. 28, 2009

(54) SLAVE DEVICE HAVING INDEPENDENT ERROR RECOVERY

(75) Inventors: Norman C. Chou, San Jose, CA (US); Whitney Li, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 776 days.

(21) Appl. No.: 10/933,750

(22) Filed: Sep. 3, 2004

(65) Prior Publication Data

US 2006/0053331 A1 Mar. 9, 2006

(51) Int. Cl.
*G06F 11/00* (2006.01)
*G06F 11/07* (2006.01)

(52) U.S. Cl. .............................. 714/16; 714/17; 714/44

(58) Field of Classification Search .................. 714/4, 714/18, 43, 44, 748, 16, 17, 23
See application file for complete search history.

(56) References Cited

U.S. PATENT DOCUMENTS

| | | | | |
|---|---|---|---|---|
| 4,553,236 A | | 11/1985 | Zasio et al. | |
| 4,665,520 A | * | 5/1987 | Strom et al. | 714/15 |
| 4,700,292 A | | 10/1987 | Campanini | |
| 5,157,780 A | | 10/1992 | Stewart et al. | |
| 5,251,227 A | * | 10/1993 | Bruckert et al. | 714/23 |
| 5,408,651 A | | 4/1995 | Flocken et al. | |
| 5,499,336 A | | 3/1996 | Preis et al. | |
| 5,630,047 A | * | 5/1997 | Wang | 714/15 |
| 5,774,679 A | | 6/1998 | Kondo et al. | |
| 5,790,799 A | | 8/1998 | Mogul | |
| 5,968,182 A | * | 10/1999 | Chen et al. | 714/5 |
| 6,026,499 A | * | 2/2000 | Shirakihara et al. | 714/11 |
| 6,151,684 A | * | 11/2000 | Alexander et al. | 714/4 |
| 6,202,097 B1 | * | 3/2001 | Foster et al. | 709/238 |
| 6,230,282 B1 | | 5/2001 | Zhang | |
| 6,301,670 B1 | * | 10/2001 | Motoyama et al. | 713/300 |
| 6,408,343 B1 | * | 6/2002 | Erickson et al. | 710/15 |
| 6,487,679 B1 | | 11/2002 | Arimilli et al. | |
| 6,542,512 B1 | | 4/2003 | Fischer et al. | |
| 6,691,184 B2 | * | 2/2004 | Odenwald et al. | 710/41 |
| 6,938,188 B1 | * | 8/2005 | Kelleher | 714/43 |

(Continued)

FOREIGN PATENT DOCUMENTS

EP 0077007 A3 4/1983

(Continued)

OTHER PUBLICATIONS

Master/Slave, archived verison from Aug. 10, 2004, found via the WayBack Machine http://web.archive.org/web/20040810095006/http://searchnetworking.techtarget.com/sDefinition/0,,sid7_gci783492,00.html Page updated on Nov. 25, 2003.*

*Primary Examiner*—Scott T Baderman
*Assistant Examiner*—Joseph Schell

(57) ABSTRACT

A slave device adapted to couple to a master processor and including an error handler and a communication controller. The error handler is configured to detect errors internal to the slave device and, in response to detecting at least one error and independent of the master processor, configured to select an error recovery operation based on the at least one detected error and to initiate and perform the selected error recovery operation. The communication controller is configured to communicate with the master processor according to a master/slave protocol, and configured to maintain the master/slave protocol during performance of the selected error recovery operation by the error handler.

24 Claims, 3 Drawing Sheets

U.S. PATENT DOCUMENTS

| | | |
|---|---|---|
| 7,093,154 B2 * | 8/2006 | Bartfai et al. .................. 714/4 |
| 7,178,050 B2 * | 2/2007 | Fung et al. ..................... 714/4 |
| 7,315,542 B2 * | 1/2008 | Gil et al. ..................... 370/392 |
| 2002/0105966 A1 | 8/2002 | Patel et al. |
| 2004/0003322 A1 * | 1/2004 | Collins et al. ................. 714/27 |
| 2004/0153849 A1 * | 8/2004 | Tucker et al. ................. 714/43 |
| 2004/0215998 A1 * | 10/2004 | Buxton et al. .................. 714/2 |
| 2004/0255193 A1 * | 12/2004 | Larson et al. ................. 714/26 |

FOREIGN PATENT DOCUMENTS

| | | |
|---|---|---|
| EP | 0077007 B1 | 4/1983 |
| JP | 57114954 A | 7/1982 |
| JP | 2002033876 A | 1/2002 |

\* cited by examiner

SLAVE DEVICE HAVING INDEPENDENT ERROR RECOVERY

BACKGROUND

A master-slave relationship refers to a communication protocol where one device, the master, has unidirectional control over another device, the slave. Upon establishment of such a relationship, the direction of control is typically from the master device to the slave device. A common example of such a relationship is a slave device, such as a memory device, coupled to a master central processing unit (CPU) via a parallel bus, wherein the slave device is generally under full control of the master CPU. To avoid adverse affects, such as "hanging" the bus as a result of an interrupted bus transaction, error recovery activities of the slave device are generally controlled to varying degrees by the master CPU.

Traditionally, the slave device detects and reports errors to the master CPU. Depending on the system, the master CPU may then initiate an error recovery by the slave device, instruct the slave device as to a specific type of error recovery operation to perform, or carry out the recovery operation itself. However, as slave devices continue to become more complex and more intelligent, error recovery becomes more complex as well, with each device having specific error recovery requirements. Consequently, error recovery operations of slave devices may potentially become too complex for the master CPU to intervene and, at the very least, consume increased amounts of master CPU processing time that could be spent performing other tasks.

SUMMARY

In one embodiment, the present invention provides a slave device adapted to couple to a master processor and including an error handler and a communication controller. The error handler is configured to detect errors internal to the slave device and, in response to detecting at least one error and independent of the master processor, configured to select an error recovery operation based on the at least one detected error and to initiate and perform the selected error recovery operation. The communication controller is configured to communicate with the master processor according to a master/slave protocol, and configured to maintain the master/slave protocol during performance of the selected error recovery operation by the error handler.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
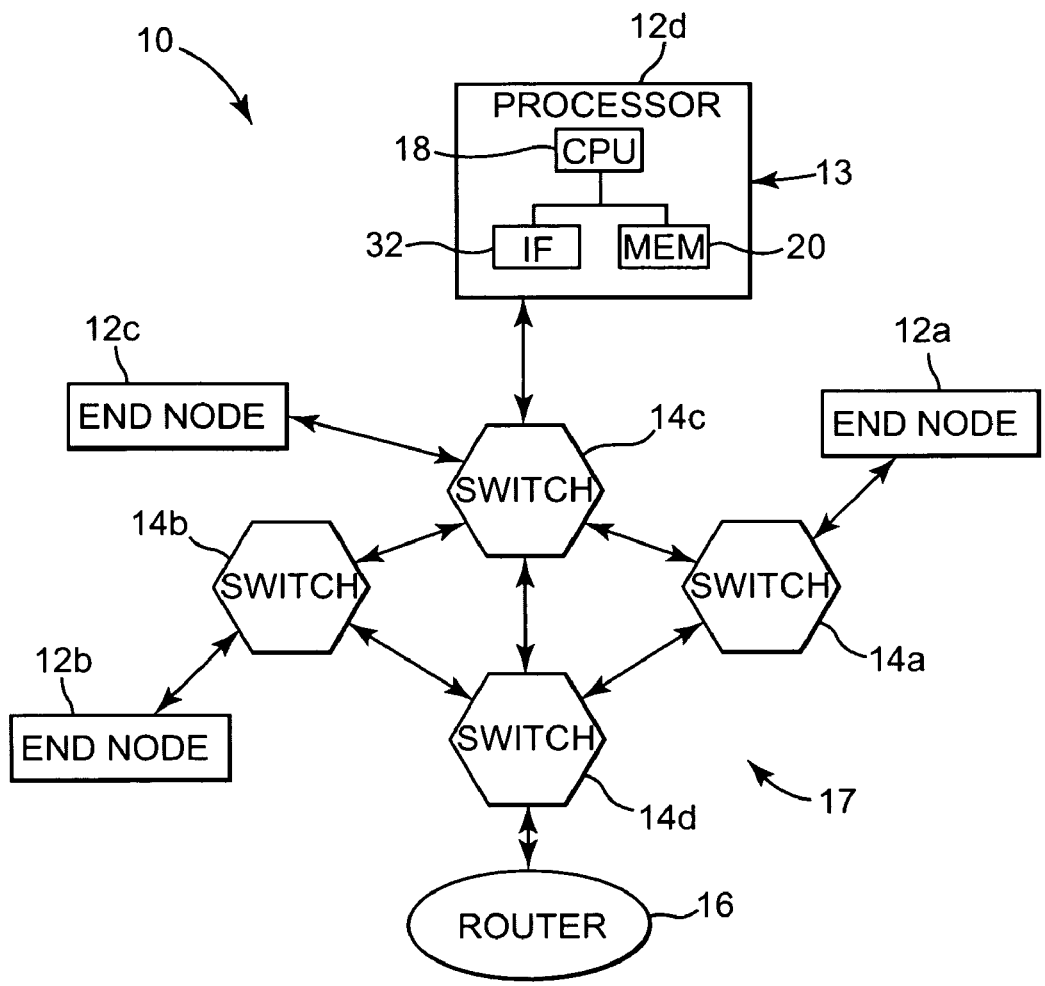
FIG. 1 is a block diagram illustrating generally a network system.

FIG. 1 is a block diagram illustrating generally a network system 10. Network 10 may be a network or a sub-network, sometimes referred to as a subnet, which is interconnected by routers to other subnets to form a larger network. Network 10 may be any type of switched network. For example, network 10 could be an InfiniBand architecture defining a switched communications fabric that allows multiple devices to concurrently communicate with high bandwidth and low latency in a protected and remotely managed environment.

Network 10 illustrates four end nodes 12a, 12b, 12c, and 12d located within network 10, collectively referred to as end nodes 12. As known by those of ordinary skill in the art, an end node 12 may represent a number of different devices, such as a processor 13 as illustrated by end node 12d. Processor 13 includes a central processing unit 18, a memory 20, such as a random access memory (RAM), and a network interface 22. Examples of other end node devices include a router to a network, or an I/O device, such as a redundant array of independent disks (RAID) subsystem. Although four end nodes 12 are illustrated, more or fewer end nodes may be located within network 10.

Network 10 further includes switches 14a, 14b, 14c and 14d, and router 16. Switches 14a, 14b, 14c and 14d, collectively referred to as switches 14, connect end nodes 12 for communication purposes. For example, processor 13 is connected to switch 14c via network interface 32. Router 16 provides a connection from network 10 to remote subnets for the transmission and reception of data packets. Together, switches 14 and router 16 form a communications fabric 17. One or more links can exist between any two devices within network 10.

Switches 14 are each capable of controlling the flow of data packets between end nodes 12, and between end nodes 12 and router 16. Each destination with network 10 has at least one associated unique local identifier (LID) which represents a path through switches 14. Switches 14 transmit packets of data based upon a destination address, wherein the destination address is located in a local route header portion of the data packet and contains the LID for reaching a destination. When individual packets are received by a switch 14, the data packets are forwarded based on the local identifier within the destination address. Switches 14 are not directly addressed in the traversal of packets within network 10. As such, switches 14 are transparent to end nodes 12, and packets traverse switches 14 virtually unchanged.

While intra-subnet routing is provided by switches 14, router 16 is the fundamental routing component for inter-subnet routing. As such, routers interconnect subnets by relaying packets between subnets until a packet arrives at a destination subnet. Router 16 forwards packets based on a global route header portion of a data packet. Router 16 replaces the local route header portion of a packet as it passes the packet from one subnet to another.

Within any network system, such as network system 10, a master/slave relationship may exist between and/or within different system components. For example, a master/slave relationship can exist between processor 13 and switch 14c, or between CPU 18 and memory 20 of processor 13. While the above examples illustrate master/slave relationships within a network architecture, such relationships can exist between devices regardless of whether they are part of a larger network system.

Figure 2:
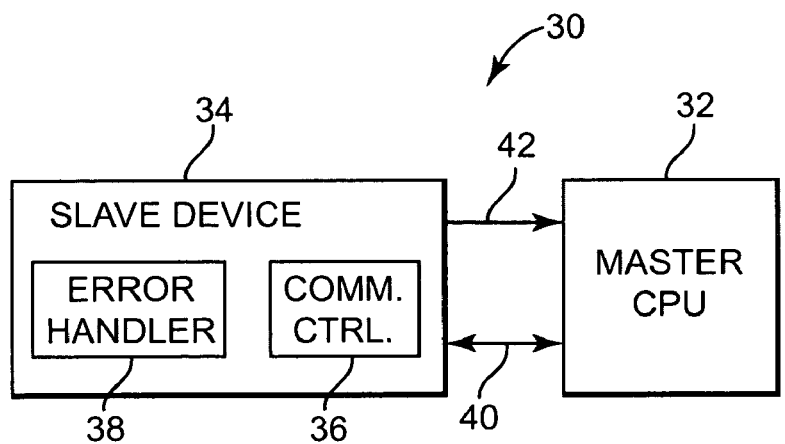
FIG. 2 is a block diagram illustrating generally a master/slave system according to the present invention.

FIG. 2 illustrates generally a master/slave system 30 including a master CPU 32 and a slave device 34 according to the present invention. Slave device 34 further includes a communication controller 36 and an error handler 38. Error handler 38 is configured to detect errors internal to slave device 34 and, in response to detecting at least one error and independent of master CPU 32, configured to select an error recovery operation based on the at least one detected error and to initiate and perform the selected error recovery operation. Communication controller 36 is configured to communicate with the master CPU 32 according to a master/slave protocol, and configured to maintain the master/slave protocol during performance of the selected error recovery operation by the error handler 38.

Upon completion of the selected error recovery operation, communication controller 36 is configured to provide a reset interrupt signal 42 to master CPU 32 to notify master CPU 32 that an error recovery operation has been performed and that some data transferred between master CPU 32 and slave device 34 via link 40 may have been lost or corrupted. In one embodiment, in response to reset interrupt signal 42, master CPU 32 is configured to initiate a checkpoint retry operation. In one embodiment, error handler 38 is configured to detect a plurality of types of error and to select the desired error recovery operation from a plurality of error recovery operations based on the type or combination of types of errors detected.

By detecting errors, selecting an error recovery operation, and initiating and performing the selected error recovery operation independent from the master CPU 32, slave device 34 according to the present invention enables master CPU 32 to devote processing time to other tasks that would otherwise be spent on error recovery operations of slave device 34. Furthermore, slave devices having independent error recovery capabilities, such as slave device 34 including error handler 38, can employ complex error recovery schemes tailored to their own particular designs and thereby eliminate the need for the master CPU, such as master CPU 34, to have separate error recovery mechanisms for each slave device to which it may be coupled.

Figure 3:
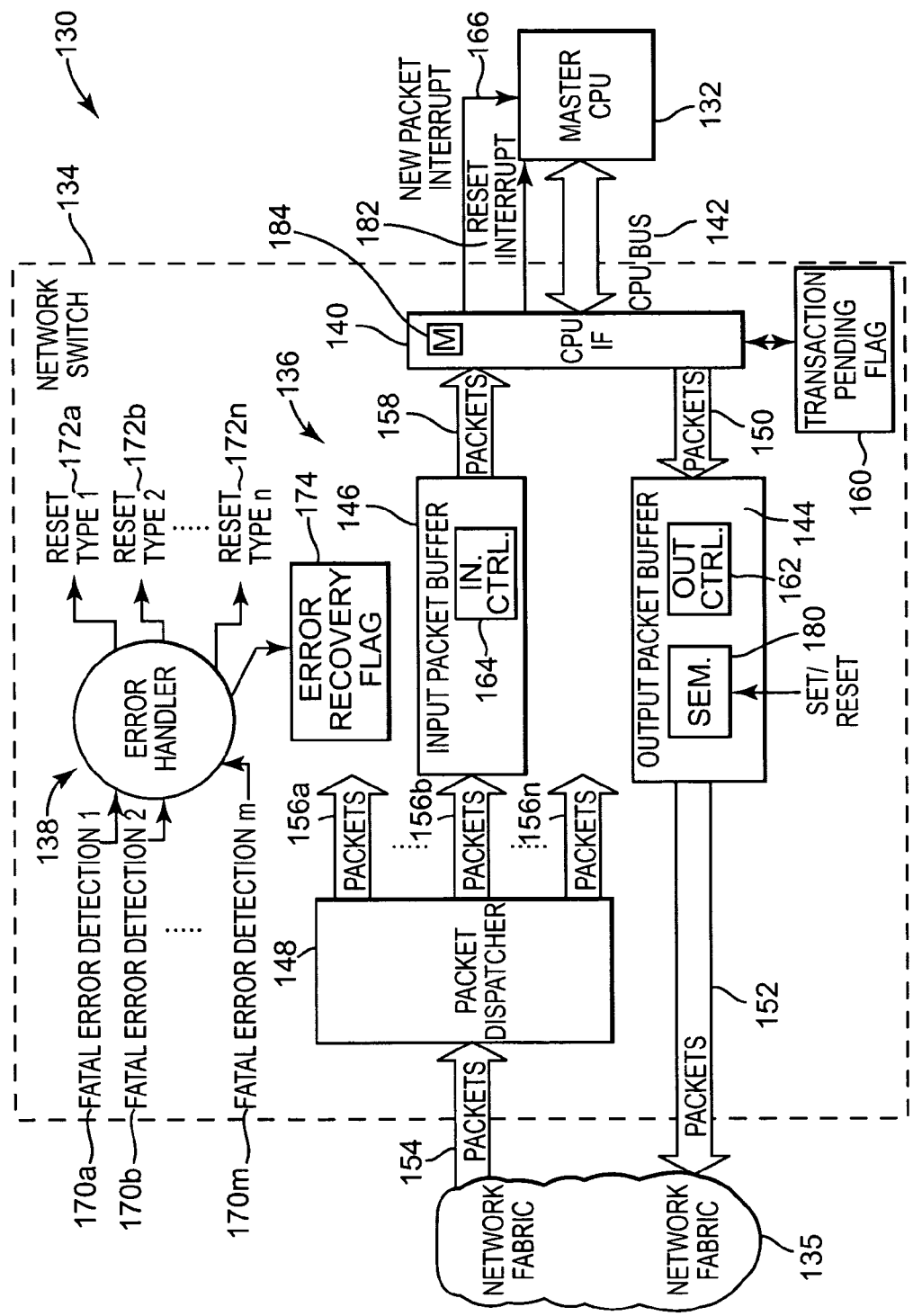
FIG. 3 is a block diagram illustrating one embodiment of a network switch according to the present invention.

FIG. 3 is a block diagram illustrating generally portions of an example network switch 134 with independent error recovery in accordance with one embodiment of the present invention. Network switch 134, along with a master CPU 132, form a portion of a network system 130, which further includes a network fabric 135. Network switch 134 comprises a portion of a larger network fabric 135, which may include additional network switches and/or routers, such as networks switches 14 and router 16 of network fabric 17 of FIG. 1. Similarly, master CPU 132 represents one end node of a plurality of end nodes of network system 130 which may be coupled to network fabric 135, such as end nodes 12 of FIG. 1. Like end nodes 12, master CPU 132 has a corresponding unique LID.

Network switch 134 is configured to direct and control the flow data packets between master CPU 132 and other end nodes of network system 130. Network switch 134 includes a communication controller 136 and an error handler 138. Communication controller 136 includes a CPU interface (IF) 140 coupled to master CPU 132 via a CPU bus 142, an output packet buffer 144, an input packet buffer 146, and a packet dispatcher 148. Output packet buffer 144 and packet dispatcher 148 are respectively coupled to network fabric 135 via link 152 and link 154.

CPU IF 140 is configured to carry out data transactions with master CPU 132 according to a system protocol. In one embodiment, each data transaction comprises a predetermined number of data bytes. Upon receiving the predetermined number of data bytes from or sending the predetermined number of data bytes to master CPU 132, CPU IF 140 provides an acknowledge (ACK) signal to master CPU 132 indicating that the transaction is complete. As such, multiple transactions are required for CPU IF to receive a data packet from or to send a data packet to master CPU 132. In another embodiment, CPU IF 140 may carry out data transactions with master CPU 132 according to burst mode protocol. In one embodiment, CPU IF 140 comprises a microcontroller.

It should be noted that, while illustrated as being coupled only to master CPU 132, network switch 134 may be coupled to and configured to direct and control the flow of data to/from multiple end nodes via multiple links, such as illustrated by network switch 14c of FIG. 1. Similarly, while illustrated as being coupled only to network switch 134, master CPU 132 may be coupled to additional devices, including other slave devices.

Typically, an end node sending or originating a data packet is referred to as a source end node, and an end node receiving or consuming a data packet is referred to as a destination end node. As such, master CPU 132 can operate as both a source end node and a destination end node. The operation of network switch 134 when transferring data from master CPU 132 to network fabric 135 (i.e. when master CPU 132 is operating as a source end node) is described briefly below.

To initiate a data transaction so as to transmit data packets to a destination end node via network fabric 135, master CPU 132, in accordance with the system protocol, provides a notification signal to CPU IF 140 via CPU bus 142 indicating that it wishes to carry out a data transaction. In one embodiment, master CPU 132 notifies CPU IF 140 that if wishes to carryout a data transaction by asserting a chip select signal associated with CPU IF 140. After asserting the chip select signal, master CPU 132 provides a transaction signal to CPU IF 140 indicating the type of transaction it wishes to carry out. In one embodiment, the transaction signal comprises a write command when, as here, master CPU 132 is operating as a source end node, and a read command when master CPU 132 is operating as a destination end node.

In response to the transaction signal, CPU IF 140 begins receiving data from master CPU 132 via CPU bus 142 according to the system protocol. As CPU IF 140 receives the data from master CPU 132, it begins transferring the data to output packer buffer 144 via a link 150. In one embodiment, CPU IF 140 performs a parallel-to-serial conversion of the data as it transfers the incoming data from master CPU 132 to output packet buffer 144. Upon completion of the transaction, CPU IF 140 provides the ACK signal to master CPU 132 to indicate that all of the data has been received. In response, master CPU 132 de-asserts the chip select signal. The above data transaction process is continuously repeated until all desired data has been transferred from master CPU 132 to network switch 134.

During each data transaction as described above, CPU IF 140 asserts a transaction flag 160 to provide indication that a data transaction is ongoing between CPU IF 140 and master CPU 132. In one embodiment, CPU IF asserts transaction flag 160 upon assertion of the chip select signal and de-asserts transaction flag 160 after providing the acknowledgement signal. As will be described in greater detail below, transaction flag 160 is employed as part of an error recovery operation by network switch 134.

As output packer buffer 144 receives data from CPU IF 140, an output controller 162 controls the transmission of the data into network fabric 135 via link 152 for subsequent transmission to the appropriate destination end node of network system 130. In one embodiment, output controller 162 is configured to begin transmitting data to network fabric 135 as soon as it is received by output packet buffer 144. In another embodiment, output controller 162 waits for a complete data packet to be received by output packet buffer 144 before transmitting the assembled data packet to network fabric 135, commonly referred to as store-and-forward process.

The operation of network switch 134 when transferring data from network fabric 135 to master CPU 132 (i.e. when master CPU 132 is operating as a destination end node) is described briefly below. Such a data transaction begins when packet dispatcher 148 receives a data packet from network fabric 135 via link 154. As mentioned above, network switch 134 may be linked to other switches or end nodes other than master CPU 132, each end node having a unique LID. As such, based on the LID included with the local header of the received data packet, packet dispatcher 148 routes the received data packet to an appropriate location within network switch 134 via links 156. Upon receiving a data packet with a local header having an LID corresponding to master CPU 132, packet dispatcher 148 routes the data packet to input packet buffer 146 via link 156b.

Upon receiving a packet having an LID corresponding to master CPU 132, an input controller 164 notifies master CPU 132 of the presence of the packet via a new packet interrupt signal 166. In response to new packet interrupt signal 166, and in a fashion similar to that described above when operating as a source end node, master CPU 132 initiates a series of CPU bus transactions in order to read packets from the input packet buffer 146. Each of the CPU bus transactions notifies CPU IF 140 that it wishes to carry out a data transaction through a notification mechanism, such as via assertion of a chip select signal. A system level protocol is followed to determine how many CPU bus transactions are needed in order to empty all the packets in the input packet buffer 146.

After asserting the chip select signal, master CPU 132 provides a transaction signal to CPU IF 140 (i.e. a read command) instructing CPU IF 140 to read data from input packet buffer 146. CPU IF 140 then begins transferring data from input packet buffer 146 to master CPU 132 via link 158 and CPU bus 142 according to a CPU bus protocol. In one embodiment, CPU IF 140 performs a parallel-to-serial conversion before transferring the data to master CPU 132. Upon transferring the last byte of data within a CPU bus transaction, CPU IF 140 signals an acknowledgement to master CPU 132 that all of the data has been sent, and master CPU 132 de-asserts the chip select signal. As before, this data transaction process is continuously repeated until all received data has been transferred from input packet buffer 146 to master CPU 132. In one embodiment, CPU IF 140 may carry out data transactions with master CPU 132 according to burst mode protocol. In one embodiment, CPU IF 140 comprises a microcontroller.

In a fashion similar to when CPU IF 140 is receiving data from master CPU 132, during each of the above described data transactions, CPU IF 140 asserts transaction flag 160 to indicate that a data transaction is ongoing between CPU IF 140 and master CPU 132. In one embodiment, CPU IF asserts transaction flag 160 upon receiving the chip select signal from the master CPU 132 and de-asserts transaction flag 160 after providing the acknowledgement signal.

In some instances, fatal errors may occur within network switch 134 when transferring data between master CPU 132 and network fabric 135. Fatal errors may include conditions such as control logic or registers having an unexpected or ambiguous state. As mentioned above, in a traditional master/slave relationship the slave device, such as network switch 134, merely detects and indicates the error to the master device, such as master CPU 132, which then initiates and controls to some degree the error recovery of the slave device. However, as described below, network switch 134 is configured to detect, select, initiate and perform an error recovery independently of master CPU 132.

Error handler 138 is configured to detect a plurality of errors internal to network switch 134, indicated as fatal errors 170a to 170m. Error handler 138 includes an error recovery protocol that, based on the fatal error 170 detected, or combination of fatal errors 170 detected, selects and initiates one of a plurality of error reset or error recovery operations, indicated as reset types 172a to 172n. Depending on the selected reset type 172, various elements of network switch 134 may be reset, such as buffers and working registers (not shown), and output and input packet buffer 144 and 146. Upon initiation of a selected error recovery operation 172, error handler 138 asserts a error recovery flag 174. The error recovery flag remains asserted until the selected error recovery operation 172 is complete.

Since error handler 138 independently initiates a selected error recovery operation 172, CPU IF 140 is configured to complete on-going and pending data transactions with master CPU 132 during performance of the selected error recovery operation in order to maintain the system protocol with master CPU 132 to thereby avoid hanging CPU bus 142. In one embodiment, CPU IF 140 monitors the status of transaction pending flag 160 and error recovery flag 174. Whenever error recovery flag 174 is asserted by error handler 138 while transaction pending flag 160 is asserted (indicating an on-going transaction), CPU IF 140 asserts a semaphore 180 to block the transfer of data packets to network fabric 135. Semaphore 180 functions to prevent data packets potentially corrupted by the fatal error 170 but still having a good set of CRC check bits, which are automatically generated by the output packet buffer controller 162, from being transmitted into network fabric 135.

If the error recovery flag 174 is asserted while CPU IF 140 is receiving data from master CPU 132 (i.e. ongoing transaction pending flag 160 is set), CPU IF 140 is configured to complete the on-going transaction even though CPU IF 140 is aware that semaphore 160 is asserted and that the contents of the on-going data transaction will be discarded. Upon completion of the data transaction, CPU IF 140 provides the ACK signal to master CPU 132 and the transaction gracefully ends, even though CPU IF 140 is aware that the contents of the data transaction will not be transmitted to network fabric 135.

In one embodiment, if semaphore 180 is asserted while a data packet is in the process or being transmitted to network fabric 135 from output packet buffer 144, output controller 162 is configured to insert bogus data into the remainder of the data packet yet to be sent so that the data packet appears obviously in error to the destination end node or the next switch en route to ensure that it will be discarded as a consequence. In one embodiment, output controller achieves this by inserting a bogus CRC into the outgoing data packet.

In one embodiment, when output packet buffer is configured to store multiple outgoing data packets (i.e. a store-and-forward scheme), output controller 162 sets a pointer in response to semaphore 180 being asserted that delineates between packets received before semaphore being asserted and those data packets being received during or after semaphore 180 was asserted. Those data packets received before semaphore 180 was asserted are sent out to network fabric 135 by output controller 162 while those received during or after semaphore 180 was asserted are blocked from entering network fabric 135.

Upon completion of the selected error recovery operation, error handler 138 de-asserts error recovery flag 174 and CPU IF 140 subsequently provides a reset interrupt signal 182 to master CPU 132 to indicate that network switch 134 has just performed an error recovery operation and that some data may not have been transmitted to network fabric 135. In response, master CPU 132 is configured to initiate what is generally known to those skilled in the art as a check-point retry, and resume executions from the previously check-pointed state or recovery line. As part of the system protocol, master CPU 132, in response to the reset interrupt 182 de-asserts or resets semaphore 180 so that output packet buffer 144 can resume transmitting data packets to network fabric 135. Semaphore 180 cannot be reset by network switch 134 and must be reset by master CPU 132 as network switch 134 is not privy to when master CPU 132 has performed the check-point retry.

Depending on the type of error recovery, output packet buffer 144 may or may not be reset or cleared as part of the selected error recovery operation 172. Where output packer buffer 144 is configured to store one or more data packets, this means that redundant data packets may be transmitted into the network fabric after performance of the check-point retry by master CPU 132. However, sending redundant data packets to the destination end node is acceptable, whereas sending corrupt data packets with correct CRC check bits into the network fabric is not.

If a selected error recovery operation 172 is initiated while CPU IF 140 is carrying out a data transaction from input packet buffer 146 (i.e. both transaction pending flag 160 and error recovery flag 174 asserted) CPU IF 140 knows that input packet buffer 146 has been reset and that input controller 164 will not be able to properly complete the on-going transaction. Based on the system protocol, CPU IF 140 knows the amount of data remaining to be transferred to master CPU 132 in order to complete the on-going transaction.

In this scenario, CPU IF 140 is configured to complete the on-going data transaction by fabricating the amount of data remaining in the transaction. In one embodiment, CPU IF 140 fabricates the remainder of the data transaction by simply transferring an amount of data from the input packet buffer 146 that is equal to the remaining amount of data required to complete the on-going transaction even though CPU IF 140 is aware the data is likely invalid. In one embodiment, CPU IF 140 fabricates the remainder of the data transaction by self-generating an amount of rand data that is equal to the remaining amount of data required to complete the on-going data transaction. In still another embodiment, CPU IF 140 fabricates the remainder of the data transaction by transferring an amount of random data from a memory 184 that is equal to the remaining amount of data required to complete the on-going data transaction.

Upon fabricating completion of the ongoing data transaction, CPU IF 140 provides indication to master CPU 132 that all data has been transferred and the transaction gracefully ends. In one embodiment, the selected error recovery operation 172 is configured to be completed within the time required to complete a data transaction. In one embodiment, any subsequent data transactions initiated by master CPU 132 requesting data from input packet buffer 146 while error recovery flag 174 is asserted are fabricated in their entirety by CPU IF 140.

In a fashion similar to that described above, upon completion of the selected error recovery operation, error handler 138 de-asserts error recovery flag 174 and CPU IF 140 sends a reset interrupt signal 182 to master CPU 132 to indicate that network switch 134 has just performed an error recovery operation and that some data that CPU 132 has received is likely invalid. In response, master CPU again initiates a check-point retry to reset itself to a previous check-point. Again, as part of the system protocol, even though no outgoing data transactions may have occurred, master CPU 132, after receiving reset interrupt 182 de-asserts or resets semaphore 180 so that output packet buffer 144 is able to transmit data packets to network fabric 135.

It should be noted that semaphore 180 and reset interrupt signal 182 are set by CPU IF 140 only when error recovery flag 174 asserted while ongoing transaction pending flag 160 is also asserted. If a selected error recovery operation 172 is performed while no transaction is ongoing between master CPU 132 and CPU IF 140, no data will be affected and, thus, semaphore 180 will not have been sent and no check-point retry will need to be carried out by master CPU 132.

By isolating bus transactions with master CPU 132 from error recovery operations 172 selected by error handler 138 as described above, network switch 134 is able to perform its own sophisticated error recovery activities without intervention from master CPU 132. This frees-up master CPU 132 to perform other workloads, such as data transactions to other devices to which is may be connected, and enables network switch 134 to perform sophisticated error recovery activities that are tailored to its own needs.

Figure 4:
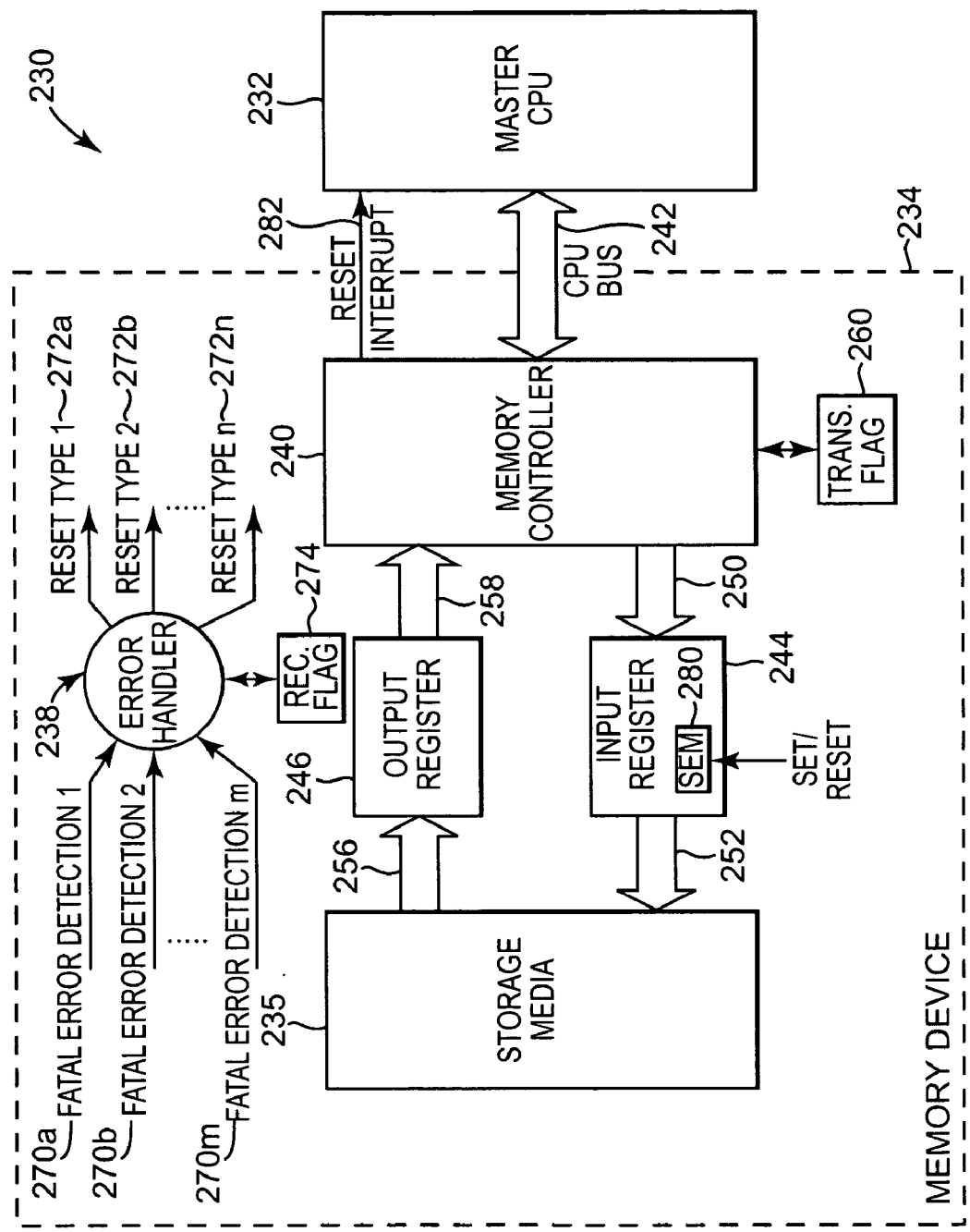
FIG. 4 is a block diagram illustrating one embodiment of a memory device according to the present invention.

FIG. 4 is a block diagram illustrating generally portions of an example memory device 234 with independent error recovery in accordance with one embodiment of the present invention. Memory device 234 is adapted to couple to master CPU 232 to form a master/slave system 230. Memory device 234 includes a storage media 235, an error handler 238, a memory controller 240 adapted to couple to master CPU 232 via CPU bus 242, and input register 244, and an output register 246.

Memory device 234 operates in a fashion similar to that described above with respect to network switch 134. Memory controller 240 is configured to carry out data transactions with master CPU 232 according to a system protocol. To write data to memory device 234, master CPU 232 asserts a chip select signal associated with memory device 234 and follows with a write command. Master CPU 232 then provides to memory controller 240 an address to which it desires to write the data. Memory controller 240 converts the address to a physical location within storage media 235 and begins receiving data from master CPU 232 via CPU bus 242. Memory controller 240 transfers the data to input register 244, which in-turn writes the data to the physical location within storage media 235. Upon receiving the predetermined amount of data (according to the system protocol) from master CPU 232, memory controller 240 provides an ACK signal to master CPU 232 indicating that the data transaction has been completed.

Similarly, to read data from memory device 234, master CPU 232 asserts the chip select signal and follows with a read command. Master CPU 232 then provides an address from which it desires to read the requested data from storage medium 235. Memory controller converts the address to a physical location within storage medium 235 and then begins transferring data in accordance with the system protocol to master CPU 232 via output register 246 and CPU bus 242. Upon transferring the predetermined amount of data in accordance with the system protocol, memory controller 240 provides an ACK signal to master CPU 232 indicating that the data transaction has been completed.

When performing either a read or a write operation, memory controller 240 asserts transaction flag 260 to indicate that a data transaction is on-going. In one embodiment, transaction flag 260 is asserted upon master CPU 232 asserting the chip select signal and de-asserted upon memory controller 240 issuing the ACK signal.

Error handler 238 is configured to detect a plurality of errors internal to memory device 234, indicated as fatal errors 270a to 270m. Error handler 238 includes an error recovery protocol that, based on the fatal error 270 detected, or combination of fatal errors 270 detected, selects and initiates one of a plurality of error reset or error recovery operations, indicated as reset types 272a to 272n. Depending on the selected reset type 272, various elements of memory device 234 may be reset, such as various buffers and working registers (not shown), and input and output registers 244 and 246. Error handler asserts an error recovery flag 274 while selected error recovery operation 272 is being performed.

If error handler 238 initiates a selected error recovery operation 272 while memory controller 240 is carrying out a data transaction with master CPU 232 associated with a write operation, memory controller 240 is configured to complete the on-going data transaction even though the data being written to storage media 235 may be corrupt. In one embodiment, when storage media 235 comprises a write-once type media, such as a compact disc, input register 244 is configured to receive a complete data transaction prior to writing data to storage media 235, and a semaphore 280 is set by memory controller 240 when both the transaction flag 260 and error recovery flag 274 are asserted. Semaphore 280 blocks the writing of potentially corrupt data to storage media 235.

Upon completion of the on-going data transaction, memory controller 240 provides the ACK signal to master CPU 232 and the transaction gracefully ends. After completion of the selected error recover operation 272, error recovery flag 274 is de-asserted and memory controller 240 provides a reset interrupt signal to master CPU 232 to indicate that memory device 234 has performed an error recovery operation. In response, master CPU 232 performs a check-point retry. If memory device 234 includes semaphore 280, master CPU 232 resets semaphore 280 as part of the system protocol upon resuming operations after performing the check-point retry.

If error handler 238 initiates a selected error recovery operation 272 while memory controller 240 is carrying out a data transaction with master CPU 232 associated with a read operation, memory controller 240 is configured to complete the on-going data transaction even though data being transferred to master CPU 232 from output register 246 may be corrupt. Based on the system protocol, memory controller 240 knows the amount of data remaining to be transferred to master CPU 232 in order to complete the on-going data transaction once the error recovery operation has been initiated (i.e. error recovery flag 274 asserted). In one embodiment, memory controller 240 completes the on-going data transaction by simply continuing to transfer to master CPU 232 the remaining amount of data required to complete the on-going data transaction from the output register 246, even though memory controller 240 knows that the data from output register 246 may be corrupt.

Again, upon completion of the on-going data transaction, memory controller 240 provides the ACK signal to master CPU 232 and the transaction gracefully ends. After completion of the selected error recovery operation 272, error recovery flag 274 is de-asserted and memory controller 240 provides the reset interrupt signal 282 to master CPU 232 to indicate that memory device 234 has performed an error recovery operation. In response, master CPU performs a check-point retry. If memory device includes semaphore 280, master CPU 232 resets semaphore 280 upon resuming operations after performing the checkpoint retry.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A slave device adapted to couple to a master processor, the slave device comprising:
    an error handler configured to detect errors internal to the slave device and, in response to detecting at least one error and independent of the master processor, configured to select an error recovery operation based on the at least one detected error and configured to initiate and perform the selected error recovery operation; and
    a communication controller configured to communicate with the master processor according to a master/slave protocol, the master/slave protocol comprising completion of a transaction that is on-going with the master processor when the error handler initiates the selected error recovery operation, the communication controller further configured to provide a reset interrupt signal to the master processor to notify the master processor that the error recovery operation has been completed, and to further notify the master processor that at least a portion of data transferred between the slave device and the master processor may have been lost or corrupted.

2. The slave device of claim 1, wherein the error handler is configured to detect a plurality of types of error and to select the desired error recovery operation from a plurality of error recovery operations based on the type of error detected.

3. The slave device of claim 1, wherein the reset interrupt signal is operative to instruct the master processor to perform a check-point retry operation whereby the master processor initiates operations from a previously check-pointed state.

4. The slave device of claim 1, wherein the communication controller is configured to perform data transactions with the master processor according to the master/slave protocol, each transaction comprising a predetermined amount of data.

5. The slave device of claim 4, wherein the communication controller is configured to fabricate an amount of data necessary to complete a data transaction on-going from the slave device to the master processor after the error handler initiates the selected error recovery operation, wherein the amount of fabricated data comprises a difference between the predetermined amount of data and an amount of data received by the master processor from the slave device prior to the initiation of the selected error recovery operation.

6. A packet routing device configured as a slave to a master processor for routing data packets between the master processor and a network fabric, the packet routing device comprising:

an error handler configured to detect errors internal to the packet routing device and, in response to detecting at least one error and independent of the master processor, configured to select and initiate an error recovery operation based on the at least one detected error, the error handler further configured to assert an error recovery flag that remains asserted until the error recovery operation is completed; and a communication controller configured to assert a transaction flag when a data transfer is taking place between the master processor and the packet routing device over a communication bus, the communication controller further configured to recognize the assertion of the error recovery flag yet complete the data transfer in order to avoid hanging the communication bus.

7. The packet routing device of claim 6, wherein the data transfer comprises a series of data transactions according to a communication protocol, each data transaction comprising a predetermined amount of data.

8. The packet routing device of claim 7, wherein the communication controller is configured to provide a fabricated amount of data necessary to complete a data transaction ongoing from the packet routing device to the master processor after the error handler initiates the selected error recovery operation, wherein the amount of fabricated data comprises a difference between the predetermined amount of data and an amount of data received by the master processor from the packet routing device prior to the initiation of the selected error recovery operation.

9. The packet routing device of claim 6, wherein the communication controller is configured to provide a reset signal to the master processor after completion of the error recovery operation to notify the master processor of the error recovery operation and to further notify the master processor that at least a portion of data transferred between the master processor and the packet routing device may have been lost or corrupted.

10. The packet routing device of claim 6, wherein the communication controller further comprises:

a blocking mechanism, wherein the communication controller sets the blocking mechanism to prevent potentially corrupted data packets from being transferred from the packet routing device to the network fabric when the selected error recovery operation is initiated while the communication controller is transferring data between the packet routing device and the master processor.

11. The packet routing device of claim 10, wherein the blocking mechanism is configured to be reset by the master processor.

12. The packet routing device of claim 10, wherein the blocking mechanism comprises a semaphore.

13. A memory device configured as a slave to a master processor, the memory device comprising:

an error handler configured to detect errors internal to the memory device and, in response to detecting at least one error and independent of the master processor, configured to select and initiate an error recovery operation based on the at least one detected error, the error handler further configured to assert an error recovery flag upon initiation of the error recovery operation;

a storage medium configured to store data; and a memory controller configured to assert a transaction flag when one of a write or a read operation is initiated upon the memory device for carrying out a data transfer between the master processor and the memory device over a communication bus, the communication controller further configured to recognize the assertion of the error recovery flag yet complete the data transfer in order to avoid hanging the communication bus.

14. The memory device of claim 13, wherein each data transfer comprises a predetermined amount of data in accordance with a communication protocol.

15. The memory device of claim 13, wherein the memory device further comprises:

a blocking mechanism, wherein the memory controller sets the blocking mechanism to prevent potentially corrupted data from being written to the storage medium when the error recovery flag is asserted.

16. The memory device of claim 13, wherein the storage medium comprises a write-once type storage medium, and a semaphore is used to prevent writing of potentially corrupt data into the write-once type storage medium.

17. The memory device of claim 13, wherein the memory controller is configured to provide a reset signal to the master processor after completion of the error recovery operation to notify the master processor of the error recovery operation and to further notify the master processor that at least a portion of data transferred between the master processor and the memory device may have been lost or corrupted.

18. A network system comprising:

a master processor; and a slave device coupled to the master processor, the slave device comprising:

an error handler configured to detect errors internal to the slave device and, in response to detecting at least one error and independent of the master processor, configured to select an error recovery operation based on the at least one detect error and configured to initiate and perform the selected error recovery operation;

a communication controller configured to communicate with the master processor according to a master/slave protocol, and configured to complete an ongoing data transfer between the slave device and the master processor in spite of being aware of the error recovery operation;

and the communication controller further configured to provide a reset interrupt signal to the master processor to notify the master processor that the error recovery operation has been completed.

19. The network system of claim 18, wherein the communication controller is configured to perform data transactions with the master processor according to the master/slave protocol, each transaction comprising a predetermined amount of data, and wherein the communication controller is configured to complete the ongoing data transfer by providing fabricated data.

20. The network system of claim 18, wherein the communication controller, upon completion of the error recovery operation, provides to the master processor a reset signal for informing the master processor of the error recovery operation.

21. A method of operating a slave device adapted to couple to a master processor, the method comprising:

communicating with the master processor according to a master/slave protocol;

detecting at least one error internal to the slave device;

selecting an error recovery operation based on the at least one detected internal error;

initiating and performing the selected error recovery operation independent of the master processor;

completing at least one of a) a pending data transaction or b) an ongoing data transfer between the slave device and the master processor over a communication bus, regardless of a concurrent occurrence of the error recovery operation, in order to avoid disrupting the communication bus;

and providing a reset interrupt signal to the master processor to notify the master processor that the error recovery operation has been completed.

22. The method of claim 21, wherein communicating with the master processor further comprises:

performing data transactions with the master processor according to the master/slave protocol, each transaction comprising a predetermined amount of data.

23. The method of claim 22, wherein completing the ongoing data transfer comprises:

fabricating an amount of data comprising a difference between the predetermined amount of data and an amount of data transferred prior to the initiation of the selected error recovery operation.

24. The method of claim 21, further comprising:

using a semaphore to block transfer of data from the slave device to an external network.

* * * * *